(12) United States Patent
Hui-hu

(10) Patent No.: US 7,001,088 B2
(45) Date of Patent: Feb. 21, 2006

(54) KEYBOARD STAND-UP ANGLE ADJUSTOR STRUCTURE

(76) Inventor: Liang Hui-hu, No. 3, pao Chi Lane, Chuang Ya Tsun, Siu Shui Hsiang, Changhua County (TW)

(*) Notice: Subject to any disclaimer, the term of this patent is extended or adjusted under 35 U.S.C. 154(b) by 0 days.

(21) Appl. No.: 10/845,132

(22) Filed: May 14, 2004

(65) Prior Publication Data
US 2005/0254875 A1 Nov. 17, 2005

(51) Int. Cl.
B41J 11/56 (2006.01)
B41J 29/06 (2006.01)

(52) U.S. Cl. .............. 400/681; 400/682; 248/127; 248/469

(58) Field of Classification Search .......... 400/472, 400/718, 681–682; 248/127, 456, 469
See application file for complete search history.

(56) References Cited

U.S. PATENT DOCUMENTS

| | | | |
|---|---|---|---|
| 5,366,197 A * | 11/1994 | Westland | 248/456 |
| 5,732,928 A * | 3/1998 | Chang | 248/688 |
| 5,746,410 A * | 5/1998 | Hung | 248/441.1 |
| 6,290,411 B1 * | 9/2001 | Shirai | 400/681 |
| 6,682,240 B1 * | 1/2004 | Chou | 400/691 |
| 2003/0198497 A1 * | 10/2003 | Liu | 400/472 |
| 2004/0033096 A1 * | 2/2004 | Choi et al. | 400/472 |

* cited by examiner

Primary Examiner—Andrew H. Hirshfeld
Assistant Examiner—Marissa Ferguson
(74) Attorney, Agent, or Firm—Troxell Law Office, PLLC

(57) ABSTRACT

A keyboard stand-up angle adjustor structure consisting of a recess in the back surface of a keyboard as well as a leading hole mount, a center hole mount, and a trailing hole mount sequentially disposed on two sides at the front, middle, and rear portions of the recess that provide for first movably coupling and unitarily integrating a positioning block and a support block. The positioning block has a male hinge end and a female hinge end respectively disposed at its anterior and posterior extremities. The male hinge end is first aligned with and then inserted into the trailing hole mount near the keyboard rear section and thereby coupled to the back surface of the keyboard. The positioning block female hinge end has two aligned and, furthermore, hollow elements with axial holes that provide for spreading apart the support block pivot posts and inserting them into the positioning block axial holes. Pivot pins protrude outward from the opposite extremity of the support block and, furthermore, the pivot pins are fitted into the leading hole mount or the center hole mount of the keyboard to respectively provide for the keyboard level state or propped up state. As such, the keyboard is postured vertically on the desktop when it is not utilized to providing for additional usable desktop area, thereby achieving practical convenience and, furthermore, without occupying space.

6 Claims, 5 Drawing Sheets

KEYBOARD STAND-UP ANGLE ADJUSTOR STRUCTURE

BACKGROUND OF THE INVENTION

1) Field of the Invention

The invention herein relates to a keyboard stand-up angle adjustor structure consisting of a recess in the back surface of a keyboard as well as a leading hole mount, a center hole mount, and a trailing hole mount sequentially disposed on the recess to provide for first aligning a positioning block male hinge end with and then inserting it into a trailing hole mount near the keyboard rear section for coupling to the back surface of the keyboard, enabling the support block already movably coupled to the positioning block to be fitted into the leading hole mount or the center hole mount of the keyboard to respectively provide for the keyboard level state or propped up state, thereby providing for vertically posturing the keyboard on the desktop when not utilized to provide for additional usable desktop area, thereby achieving practical convenience and, furthermore, without occupying space.

2) Description of the Prior Art

Conventional keyboard structures have angle adjustors movably attached to the underside of the keyboard. When the angle adjustors are rotated outward, the keyboard surface is set at a certain incline with respect to the desktop in order to accommodate different angles as per user habit and thereby facilitate typing as well as enhance work efficiency. However, at present many office personnel place both computers and keyboards on their desktops. Whether traditional keyboards or the latest researched and developed variable angle keyboards, there is no way around leaving them on desktops when they are not in use such that otherwise usable desktop space is occupied. With office personnel limited to what little available desktop space remains, this leads to frustrating utilization problems.

DETAILED DESCRIPTION OF THE INVENTION

Figure 1:
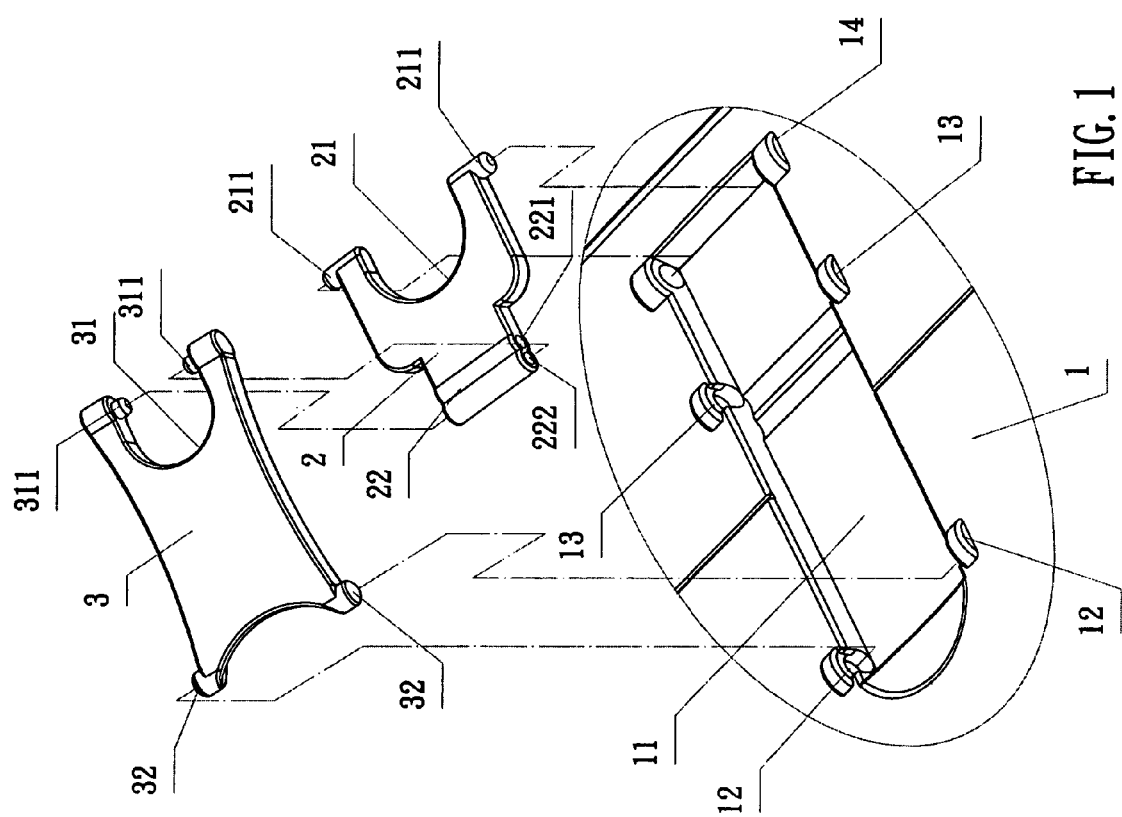
FIG. 1 is an exploded drawing of the invention herein.
Figure 2:
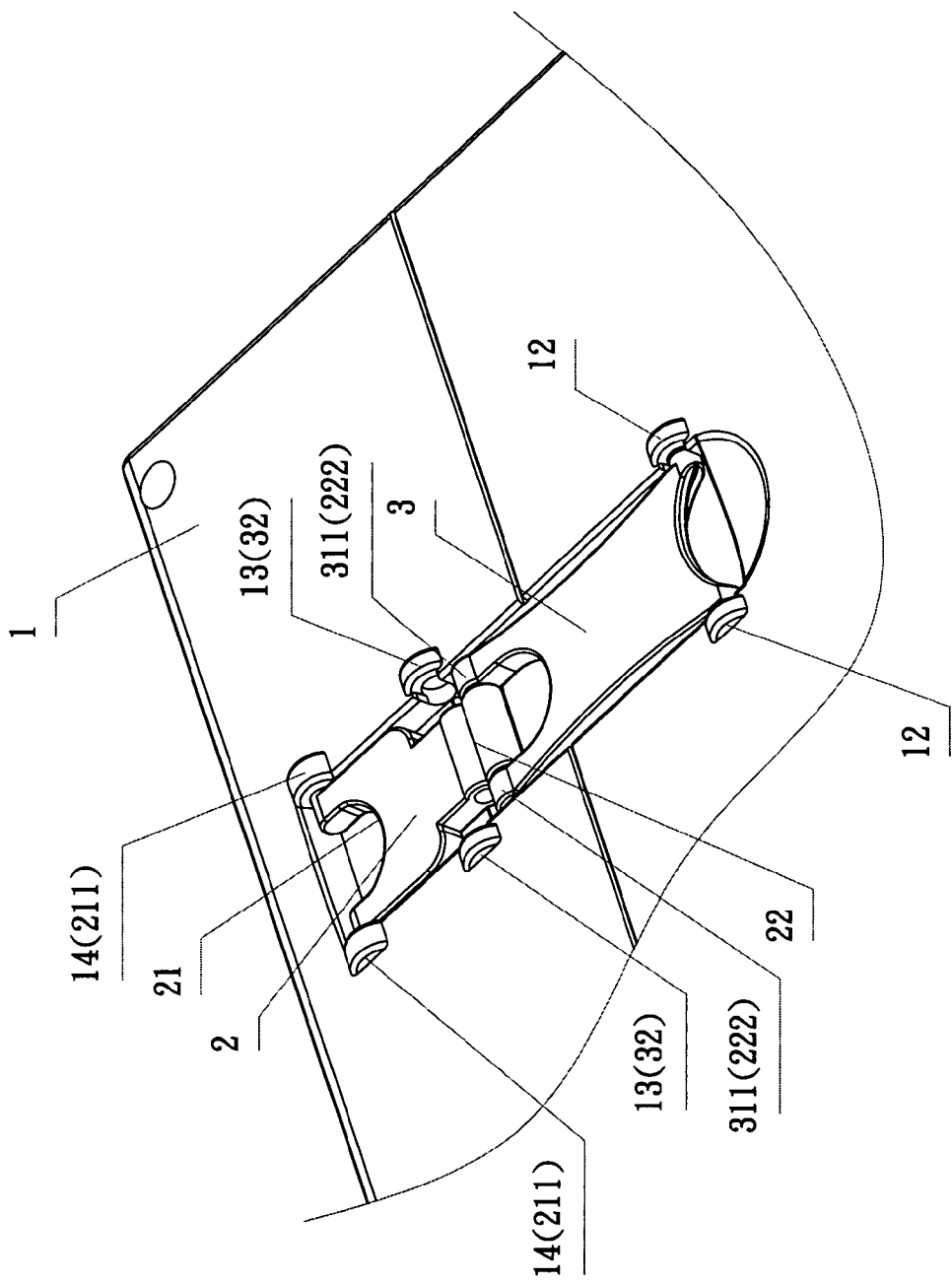
FIG. 2 is an isometric drawing of the embodiment in which the keyboard is in the level state.

Referring to FIG. 1 and FIG. 2, the structural arrangement of the invention herein, the present invention consists of a recess 11 in the back surface of a keyboard 1 and three hole mounts: a leading hole mount 12, a center hole mount 13, and a trailing hole mount 14 sequentially disposed on two sides at the front, middle, and rear portions of the recess 11 that provide for movably coupling a positioning block 2 and a support block 3, wherein:

The said positioning block 2 has a male hinge end 21 and a female hinge end 22 respectively disposed at its anterior and posterior extremities; pivot pins 211 protrude outward at each of the two sides of the said male hinge end 21 and, furthermore, the pivot pins 211 are inserted into the trailing hole mount 14 near the keyboard 1 rear section and thereby coupled to the back surface of the keyboard 1; the female hinge end 21 at the opposite extremity of the positioning block 2 is narrower, the said female hinge end 22 having two aligned and, furthermore, hollow elements with first axial holes 221 and second axial holes 222 that provide for ensleeving and movably coupling the support block 3 pivot posts 311.

The said support block 3 has an indentation 31 along the center of one extremity and, furthermore, inward facing pivot posts 31 are disposed in the indentation 31, the said pivot posts 311 are spread apart and inserted into the positioning block 2 first axial holes 221; pivot pins 32 protrude outward from the opposite extremity of the support block 3 and, furthermore, the pivot pins 32 are fitted into the leading hole mount 12 or the center hole mount 13 of the keyboard 1 to respectively provide for the keyboard 1 level state or propped up state.

Figure 3:
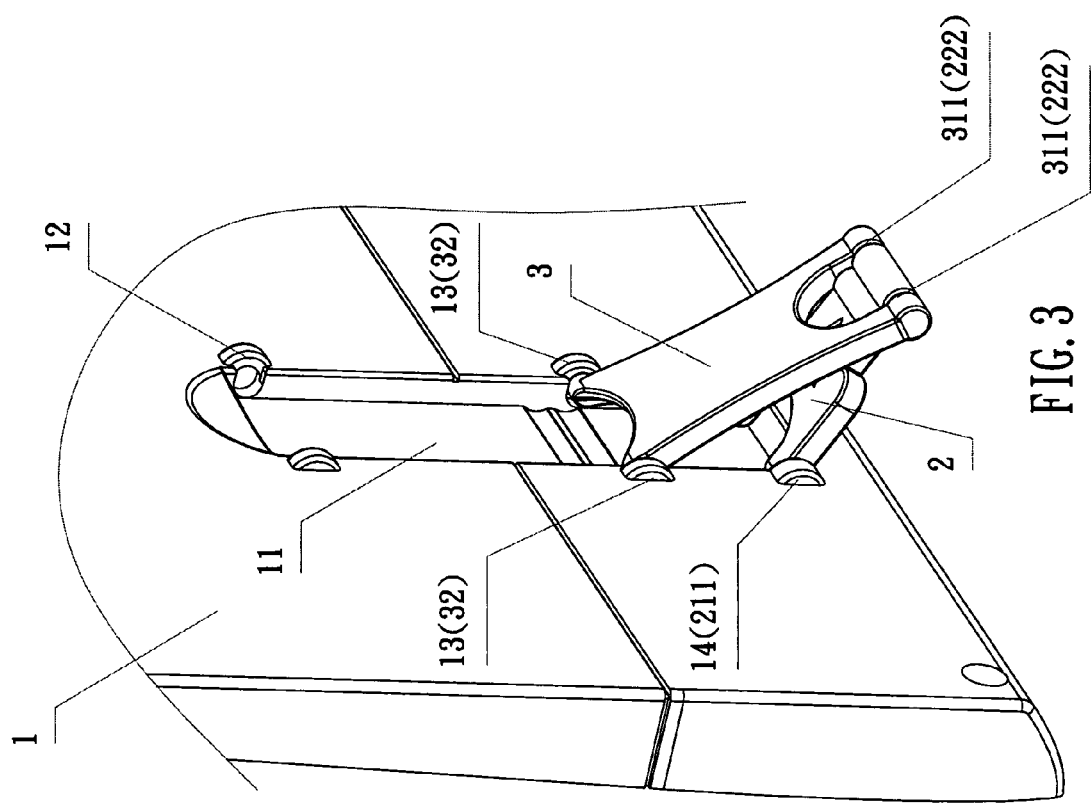
FIG. 3 is an isometric drawing of the embodiment in which the keyboard is in the vertically propped up state.
Figure 4:
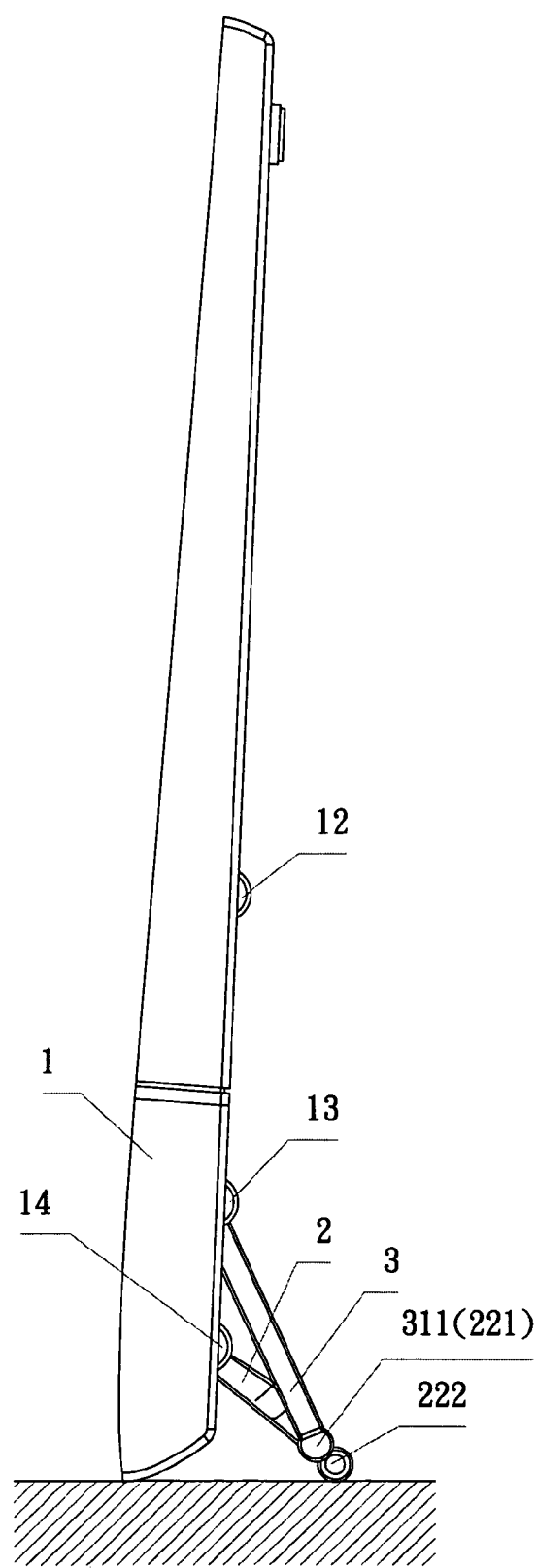
FIG. 4 is an orthographic drawing of the invention herein postured at the first axial hole.

Referring to FIG. 2, FIG. 3, and FIG. 4, the embodiments in which the keyboard is in the level state and the propped up state, when the support block 3 pivot pins 32 are fitted into the keyboard 1 leading hole mount 12, since the support block 3 pivot posts 311 are movably inserted into the female hinge end 22 first axial holes 221 of the positioning block 2, the support block 3 is capable of driving the positioning block 2 flat into the recess 11 in the bottom end of the keyboard 1 such that the keyboard 1 is postured level on a desktop, thereby providing for normal utilization (as shown in FIG. 3).

Figure 5:
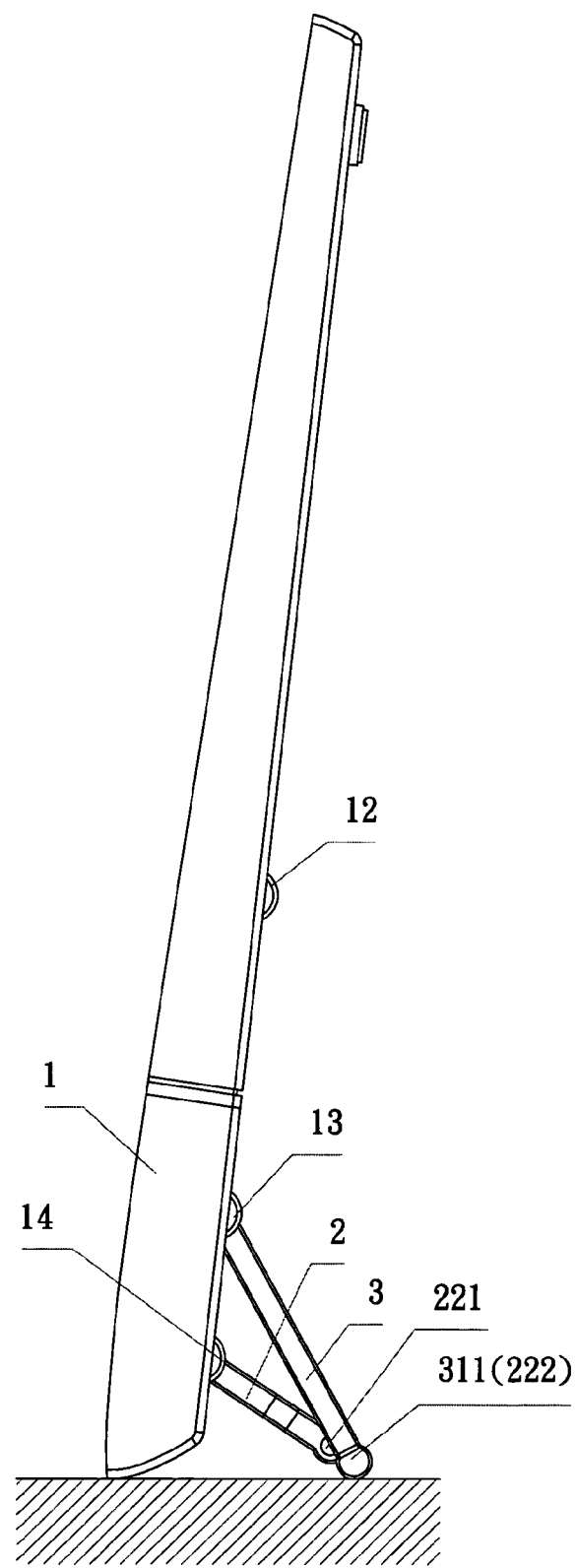
FIG. 5 is an orthographic drawing of the invention herein postured at the second axial hole.

When the support block 3 pivot posts 311 are fitted into the keyboard 1 center hole mount 13, the support block 3 pivot posts 311 drive the positioning block 2 female hinge end 22 outward arcuately into a suitable buttress angle such that the bearing point P is the movably coupled section of the support block 3 and the positioning block 2 female, and the keyboard 1 is propped up vertically on the desktop to save occupied space (as shown in FIG. 4 and FIG. 5).

Referring to FIG. 5, when the keyboard 1 is in the vertically propped up state, the support block 3 pivot posts 311 are fitted into the positioning block 2 second axial holes 222 such that the keyboard 1 inclines beyond the vertical state to prevent the keyboard 1 from falling over due to light impact.

As such, the keyboard 1 is postured vertically on the desktop when it is not utilized to providing for additional usable desktop area, thereby achieving practical convenience and, furthermore, without occupying space.

The invention claimed is:

1. An adjustable key board stand assembly comprising:
    a) a key board having a recess having:
        i) a leading hole mount located on a front of the recess;
        ii) a center hole mount located on a middle of the recess; and
        iii) a trailing hole mount located on a rear of the recess;
    b) a positioning block having:
        i) a male hinge end having two first pivot pins pivotally connected to the trailing hole mount; and
        ii) a female hinge end having two first axial holes and two second axial holes adjacent to the two first axial holes, one of the two first axial holes and one of the two second axial holes are located on each of two opposing sides of the female hinge; and
    c) a support block having:
        i) two second pivot pins located on a first end and facing inwardly and pivotally connected to one of the two first axial holes and the two second axial holes; and ii) two third pivot pins located on a second end and facing outwardly and pivotally connected to one of the leading hole mount and the center hole mount.

2. The adjustable key board stand assembly according to claim 1, wherein one of the two pivot pins extending outwardly from each of two opposing ends of the male hinge end of the positioning block.

3. The adjustable key board stand assembly according to claim 1, wherein the two second pivot pins are pivotally connected to the two first axial holes and the two third pivot pins are pivotally connected to the center hole mount.

4. The adjustable key board stand assembly according to claim 1, wherein the two second pivot pins are pivotally connected to the two second axial holes and the two third pivot pins are pivotally connected to the leading hole mount.

5. The adjustable key board stand assembly according to claim 1, wherein the two second pivot pins are pivotally connected to the two second axial holes and the two third pivot pins are pivotally connected to the center hole mount.

6. The adjustable key board stand assembly according to claim 1, wherein key board is held in a vertical position when the two third pivot pins are pivotally connected to the center hole mount.

* * * * *